United States Patent [19]

Gugliotta

[11] 3,983,388

[45] Sept. 28, 1976

[54] APPARATUS FOR HARDWARE ITEM INSPECTION

[75] Inventor: George Gugliotta, Ridgefield, Conn.

[73] Assignee: Automation Systems, Inc., Bethel, Conn.

[22] Filed: Oct. 6, 1975

[21] Appl. No.: 619,785

[52] U.S. Cl. .................... 250/223 R; 209/111.7 R; 356/241
[51] Int. Cl.² ...................................... G01D 21/04
[58] Field of Search ............... 250/221, 222, 223 R, 250/223 B, 235; 209/111.7; 356/167, 209, 237, 240, 241, 242

[56] References Cited
UNITED STATES PATENTS

| | | | |
|---|---|---|---|
| 3,565,248 | 5/1969 | Messerschmidt | 209/111.7 |
| 3,745,354 | 7/1973 | Vargo | 250/223 R |
| 3,816,746 | 6/1974 | Gugliotta et al. | 356/241 |

Primary Examiner—David C. Nelms
Attorney, Agent, or Firm—Martin Novack

[57] ABSTRACT

The present invention is directed to an apparatus for automatically examining hardware items progressing along a track to detect their characteristics and automatically sort the items in accordance with their characteristics. In accordance with one embodiment of the invention there is provided a nut inspection apparatus for monitoring the height of nuts, the apparatus being adaptable to also determine if threading is present on the inner surface of the nuts. In this embodiment there is provided a ramp for carrying the nuts, the ramp having a slot which defines an inspection position. A laser beam is split into first and second beams and adjustable means are provided for directing the first beam transverse the ramp and over the slot at the inspection position, the means being adjustable to a predetermined position above the ramp. A first photodetector is provided for receiving the first beam in the absence of a nut of prescribed height at the inspection position. Means are provided for directing the second beam toward the inner surface of a nut at the inspection position. A second photodetector is provided for receiving through the slot the light reflected from the inner surface of the nut. Means enabled by the output of the second photodetector are provided as being responsive to the output of the first photodetector for generating a height monitoring occurrence indication. Also, means enabled by the output of the first photodetector are provided for generating a thread indicative occurrence indication when the output of the second photodetector exceeds a predetermined threshold level.

3 Claims, 4 Drawing Figures

APPARATUS FOR HARDWARE ITEM INSPECTION

BACKGROUND OF THE INVENTION

This invention relates to inspection systems and, more particularly, to an apparatus for examining hardware items to determine their characteristics.

The manufacture of small hardware items, such as nuts and bolts, is a largely mechanized highspeed operation. The manufacturing cost of individual units of the finished product may typically be a fraction of a cent, so a careful manual or visual inspection of individual units is generally impractical. Accordingly, such inspection is normally omitted and a disturbing percentage of defective items can appear in any given batch.

In certain instances the presence of even a small number of defective hardware items can have severe consequences. An example is the manufacture of fasteners known as "Teenut" fasteners. The fastener nuts have a small integral body which consists of a cylindrical neck portion and an annular flange which extends radially at one end of the neck. The neck portion has an inner threading which is formed by a stamping operation during manufacture. Unfortunately, the stamping operation is not perfect and some nuts pass through production without receiving an inner threading. The completed fastener nuts are utilized for fastening together larger metal parts, e.g. the body metal of an automobile. If, after a number of nuts have been welded to a body member, it is discovered that one nut is without threading, the whole member can be considered a reject. Worse yet, an improper and incomplete fastening of body members can result from such an occurrence. In view of this possibility, Teenut fasteners are ordinarily inspected visually by workers to segregate non-threaded nuts as a final stage of nut manufacture. This operation insures against the presence of most defects but is subject to human error and involves labor expense.

In the U.S. Pat. No. 3,816,746, assigned to the same assignee as the present invention, there is disclosed an apparatus for automatically examining the surfaces of hardware items progressing along a track toward a first receiving location and for urging the items toward a second receiving location when a specified surface condition is detected; viz., the absence of threading. Briefly, a laser beam is directed toward the supposedly threaded surface and scanned thereon transverse the direction of the threads. A photodetector is disposed to detect light reflected from the surface. Since a threaded surface has different reflection properties than a non-threaded surface, the photodetector output can be utilized to detect non-threaded items and these are automatically deflected toward the second receiving location.

The apparatus described in the above-referenced patent operates quite satisfactorily, but there are other characteristics of hardware items which it would be desirable to automatically inspect without the need for employing unduly expensive additional equipment or complex modifications to present equipment. For example, when nuts are initially fed to a tapping machine, it is found that some of the nut "blanks" do not have the desired hole in the center, this commonly occuring due to defects in the molding procedure. When a nut blank with a blocked hole is fed to the tapping machine, the tap can be damaged which results in expensive tap repair and down time. Accordingly, visual inspection, which is subject to human error and involves labor expense, is sometimes used. It would be desirable to have a machine which could automatically and reliably perform this function. It would also be desirable to have the ability to sort hardware items in accordance with their thread coarseness or their height dimensions, these functions also being commonly performed by visual inspection. It is, in particular, an object of the present invention to provide a single versatile machine which has the capability of performing automatic inspection techniques of various characteristics of hardware items with a minimum of optical and electronic components which serve multiple purposes as desired by a user.

SUMMARY OF THE INVENTION

The present invention is directed to an apparatus for automatically examining hardware items progressing along a track to detect their characteristics and automatically sort the items in accordance with their characteristics.

In accordance with one embodiment of the invention there is provided a nut inspection apparatus for monitoring the height of nuts, the apparatus being adaptable to also determine if threading is present on the inner surface of the nuts. In this embodiment there is provided a ramp for carrying the nuts, the ramp having a slot which defines an inspection position. A laser beam is split into first and second beams and adjustable means are provided for directing the first beam transverse the ramp and over the slot at the inspection position, the means being adjustable to a predetermined position above the ramp. A first photodetector is provided for receiving the first beam in the absence of a nut of prescribed height at the inspection position. Means are provided for directing the second beam toward the inner surface of a nut at the inspection position. A second photodetector is provided for receiving through the slot the light reflected from the inner surface of the nut. Means enabled by the output of the second photodetector are provided as being responsive to the output of the first photodetector for generating a height monitoring occurrence indication. Also, means enabled by the output of the first photodetector are provided for generating a thread indicative occurrence indication when the output of the second photodetector exceeds a predetermined threshold level. In this manner, the equipment is capable of both height detection and detection of the presence of threads.

In accordance with a further feature of the invention, the presence of a nut at the inspection position is detected using the first beam and the first photodetector and the output of the second photodetector is counted to determine the presence of blocked holes in nut blanks which are manifested by output counts of unity. In this feature of the invention, the roles of the two beams are reversed with respect to their function in the height inspection technique above.

In accordance with a still further feature of the invention, there is provided a technique for detecting the threading frequency of hardware items; i.e., whether the items have fine or coarse threading. In accordance with this feature, counting means are coupled to the output of the photodetector which is positioned to detect the light reflected from the inner surface of the item at the inspection position. As the beam is scanned, pulses which exceed a predetermined threshold level during the presence of an item at the inspection position are automatically counted and an occurrence indication is generated as a function of the final count for each item.

Further features and advantages of the invention will become more readily apparent from the following detailed description when taken in conjunction with the accompanying drawings.

DESCRIPTION OF THE PREFERRED EMBODIMENT

Figure 1:
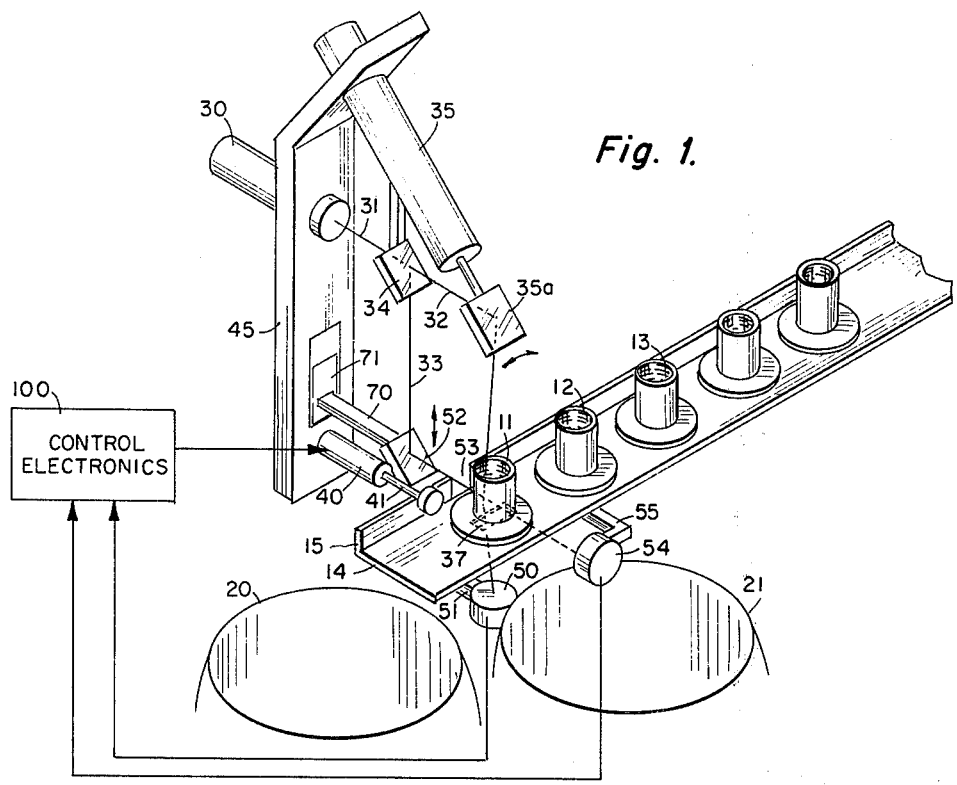
FIG. 1 is an elevational view, partially in perspective and partially in block form, of an embodiment of the invention.

Referring to FIG. 1, there is shown an embodiment of an automatic inspection system in accordance with the invention. A number of Teenut fastener nuts 11, 12 and 13 are illustrated as progressing down a narrow ramp 14 toward a receiving chute 20, the ramp 14 being provided with a side guard rail 15. The nuts will typically have been fed from a commercially available supply bin (not shown) which employs a vibratory action to move the nuts to the ramp in an orderly fashion. A reject chute 21 is provided to receive defective nuts which are deflected toward the chute 21 under control of electronics 100 in a manner to be described.

The inspection system includes a laser 30, a galvanometer-mirror 35 and a solenoid 40 which are mounted on a common support frame 45. The frame 45 may be mounted (by means not shown) on the ramp or on structural members which support the ramp. The laser 30, preferably a low-power device such as a helium-neon gas laser, generates a beam 31 which is split into separate beams 32 and 33 by a beam splitter 34.

Figure 2:
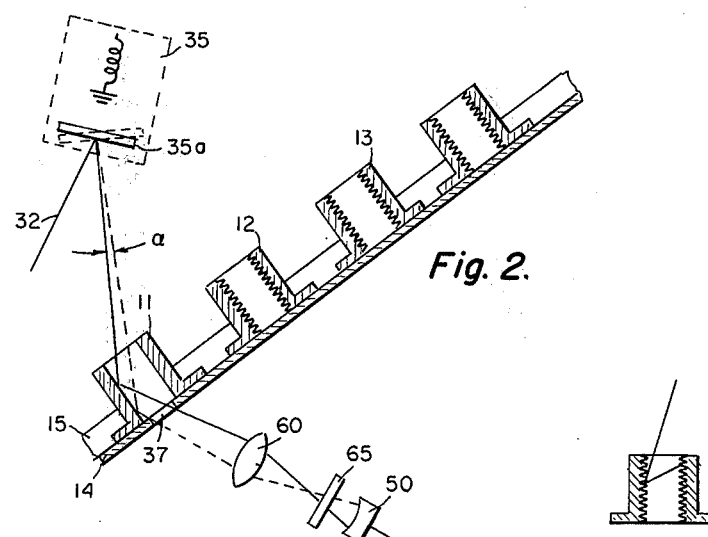
FIG. 2 is a cross-sectional representation of a portion of the embodiment of FIG. 1.

In one thread inspection mode, beam 32 is reflected off the mirror surface of galvanometer-mirror 35 toward the inner surface of the nut 11, which is shown as being located at an "inspection position." The inspection position is generally defined by a small slot 37 in the ramp which is shown in broken line in FIG. 1 and can be visualized in FIG. 2. A photodetector 50 is mounted by a bracket 51 to the ramp 14. Photodetector 50 is positioned to receive, under certain circumstances, most of the energy of the beam 32 after it has been reflected off the inner surface of a nut at the inspection position.

The beam 33 is reflected off a mirror 52 and through a slot 53 in the guard rail 15. When not intercepted by a nut at the inspection position, the beam is ultimately received by another photodetector 54 which is mounted on the ramp 14 by a bracket 55. In the present mode of operation the output of photodetector 54, or more precisely the absence of same, indicates the presence of a nut at the inspection postion. If, during this presence, the output of photodetector 50 indicates that the nut has an unthreaded inner surface, the nut is immediately deflected into the reject chute by action of the plunger 41 of solenoid 40. The solenoid is preferably located at about the inspection position or slightly downstream from the inspection position, depending on the reaction time of the circuitry and solenoid.

FIG. 2 illustrates the manner in which the inspection beam 32 scans the inner surface of a nut at the inspection position in the present mode of operation, this technique being described in detail in the above-referenced U.S. Pat. No. 3,816,746. The mirror 35A of galvanometer-mirror 35 is oriented to direct the beam 32 toward a surface which is adjacent the slot 37 and perpendicular to the ramp surface. In the present embodiment, the mirror is driven at a frequency of about 800 HZ and causes the beam to scan over an angle $\alpha$ equal to approximately 4°. The frequency is sufficiently high to insure that the beam scans at least once over the inner surface of the nut passing through the inspection position. In any given system, the available scan time for each nut is determined by the velocity of the nuts passing the scanning position and the nut dimensions, so the selected frequency should take account of the maximum nut velocity.

The photodetector 50 is positioned approximately in the path of the inspection beam when assuming the beam to have been reflected off an unthreaded surface. This is illustrated in FIG. 2 where the nut 11 at the inspection position is depicted as being unthreaded. The extreme positions of the scanning beam are shown in solid and broken line, and it is seen that the photodetector is in a position to receive the beam as it scans over the nut's inner surface, the angle of reflection of the beam off the surface substantially equalling the angle of incidence of the beam thereon. A lens 60 is preferably provided to help collect the light to be received at the photodetector 50. A light filter 65, having a pass characteristic which matches the laser wavelength, is disposed in front of the photodector. The use of a monochromatic beam in conjunction with the filter is advantageous in minimizing the possibility of ambient light extraneously exciting the photodetector. A light filter can be similarly employed to advantage in conjunction with photodetector 54.

Figure 2A:
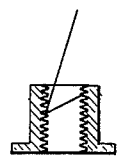
FIG. 2A is a cross-sectional representation of a threaded nut impinged upon by the inspection beam of the invention.

FIG. 2A illustrates the type of reflections the inspection beam experiences when it is incident on a properly threaded inner surface of a nut. As the beam sweeps over the irregular surface it is dispersed to some degree. Some light energy will generally be reflected toward the photodetector, but the overall amount of light received will be less than in the case of an unthreaded nut.

Figure 3:
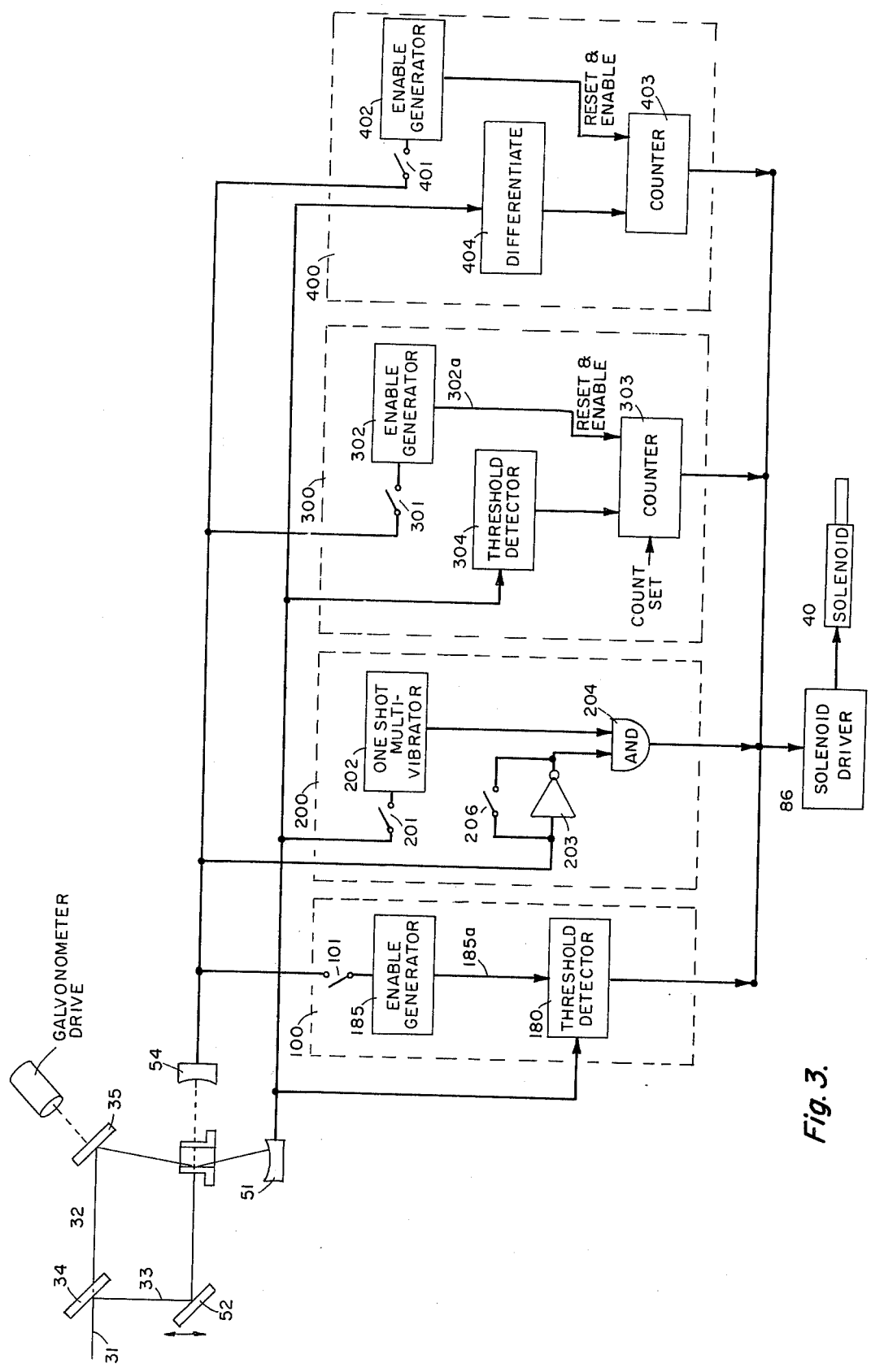
FIG. 3 is a simplified diagram of the operation of the invention including a block diagram of the electronics.

FIG. 3 shows a simplified view of the beams 32 and 33 as well as a block diagram of the electronics which process the outputs of photodetectors 50 and 54. In accordance with the various modes of operation, the electronics 100, 200, 300 and 400, each designated within a dashed enclosure, are respectively activated by the switches 101, 201, 301, and 401. For operation in the thread inspection mode, the switch 101 is closed. Accordingly, the output of photodetector 50 is coupled to a threshold detector 180 which is adjusted to produce an output "occurrence indication" on a line 180A when the photodetector output exceeds a predetermined level contemporaneously with the presence of an enable signal on the line 185A. The detector 180 may include electronic filter means as described in the above referenced U.S. Pat. No. 3,816,746. The output of photodetector 54 is coupled to an enable generator 185 which produces the enable signal on line 185A during the time that the photodetector output is below a specified level. In this manner, the threshold detector 180 is enabled only when a nut bore is at the inspection position and blocks the activate beam 33 from being received by photodetector 54.

The line 180A is coupled to a solenoid driver 86 which is activated by an occurrence indication to energize solenoid 40. The plunger 41 then extends to reject the unthreaded nut which is at or just past the inspection position.

The electronics in dashed enclosure 200, activated by closing switch 201, are employed for height inspection. In this mode of operation the beam 32 is utilized to determine the presence of the part at the inspection position, and if there is an interruption of the beam, the part is of oversized height and is rejected. The relative height of adjustable mirror 52 is predetermined by appropriate setting of set screw mechanism 70 (not visible) which is adjustable to precise positions along a slot 71 in support frame 45. In operation, the output of photodetector 50 is coupled to a one shot multivibrator 202 which generates a pulse having a duration which is less than the time the part spends in the inspection position, such as 10 milliseconds. The output of photodetector 54 is coupled to an inverter 203, and the output of one shot multivibrator 202 and inverter 203 are inputs to an AND gate 204 whose output, in turn, is coupled to the solenoid driver 86. When the part enters the inspection position the one shot multivibrator 202 is activated and, if the part exceeds specified height tolerances, the beam 33 will be blocked which will, in turn, cause a "high" output from inverter 203. Accordingly, the two "high" inputs to AND gate 204 activate the solenoid and cause rejection of the part which exceeds the predetermined height specifications. If desired, operation can be modified to cause rejection of parts which are below a minimum specified height, this being done by shorting out inverter 203, such as by closing switch 206. In such event, an output from photodetector 54 during the presence of a part at the inspection position causes a rejection of the part. Variations on the electronics portion 200 will occur to those skilled in the art, such as providing for splitting of the beam 33 into two beams and utilizing a pair of photodetectors 54 at two relative heights to achieve simultaneous inspection of maximum and minimum height specifications and/or other desired sorting requirements.

In the thread sorting mode of operation, the switch 301 is closed and the electronics shown in enclosure 300 are operative. The output of photodetector 54 is utilized to detect the presence of a part at the inspection position and an enable generator 302 is activated thereby to generate a signal on line 302A. A counter 303 is reset and enabled by the signal on line 302A. As the beam 32 is scanned over the threaded surface of the part, the output of photodetector 50 will be a signal having a series of peaks that characterize reflection components as the beam is scanned over individual threads, the number of peaks being indicative of the thread count per unit excursion in the scanned direction. The output of photodetector 50 is coupled to a threshold detector 304 which generates an output pulse of very short duration each time the output of photodetector 50 exceeds a predetermined threshold level. These pulses are received by counter 303 which is preadjusted with a particular count to generate an output when the preadjusted count is exceeded. The output of counter 303 is coupled to the solenoid driver circuit and, in this manner, parts can be sorted in accordance with their thread counts which relate directly to their thread geometries.

The electronics in enclosure 400, activated by closing switch 401, is employed in conjunction with the system for detecting nut "blanks" which do not have the desired hole in the center and could cause damage to a tapping machine. In this mode of operation, the beam 33 is utilized to detect the entry of a part into the inspection position, so the output of photodetector 54 is coupled to an enable generator 402 whose output is, in turn, coupled to a counter 403 and operates to reset and enable the counter. The beam 32 detects the presence of a blocked hole which can be seen to cause a single blocking of the beam 32, whereas a "good" part with a hole would cause the beam 32 to be blocked twice during the part's passage through the inspection position. Accordingly, the output of photodetector 50 is differentiated by circuitry 404 to generate a pulse at the leading edge of each blocking event, and the output of differentiater 404 is coupled to the counter 403 which counts the number of blocking events for each part. When a count of two is sensed, the counter generates an output on line 403A which activates the solenoid 40 and rejects any part having a blocked hole.

The invention has been described with reference to particular embodiments, but it should be understood that variations within the spirit and scope of the invention will occur to those skilled in the art. For example, the counters designated as units 303 and 403, for purposes of explanation, could typically be a single counter shared for the two modes of operation.

I claim:

1. Nut inspection apparatus for monitoring the height of nuts and adaptable to also determine if threading is present on the inner surface thereof, comprising:
    a. a ramp for carrying said nuts, said ramp having a slot which defines an inspection position;
    b. means for generating a laser beam;
    c. means for splitting said laser beam into first and second beams;
    d. adjustable means for directing said first beam transverse said ramp and over said slot at the inspection position, said means being adjustable to a predetermined position above said ramp;
    e. a first photodetector for receiving said first beam in the absence of a nut of prescribed height at the inspection position;
    f. means for directing said second beam toward the inner surface of a nut at the inspection position;
    g. a second photodetector for receiving through said slot the light reflected from said inner surface;
    h. means enabled by the output of said second photodetector and responsive to the output of said first photodetector for generating a height monitoring occurrence indication; and
    i. means enabled by the output of said first photodetector for generating a thread indicative occurrence indication when the output of said second photodetector exceeds a predetermined threshold level.

2. Nut inspection apparatus for monitoring the presence of a bore hole in nuts and adaptable to also determine if threading is present on the inner surface thereof, comprising:
    a. a ramp for carrying said nuts, said ramp having a slot which defines an inspection position;
    b. means for generating a laser beam;

c. means for splitting said laser beam into first and second beams;

d. means for directing the first beam transverse the ramp and over the slot at the inspection position;

e. a first photodetector for receiving said first beam in the absence of a nut at the inspection position;

f. enable means responsive to the output of said first photodetector for generating an enable signal when a nut is at the inspection position;

g. means for directing said second beam toward the inner surface of a nut at the inspection position;

h. a second photodetector for receiving through said slot the light reflected from said inner surface;

i. means enabled by said enable signal and responsive to the output of said second photodetector for counting occurrences during which the output of said second photodetector exceeds a first predetermined threshold level;

j. means for generating a first occurrence indication when the accumulated count during said enable signal is one; and k. means enabled by the output of said first photodetector for generating a thread indicative occurrence indication when the output of said second photodetector exceeds a predetermined threshold level.

3. Apparatus for automatically examining the surfaces of hardware items progressing along a track and for determining the threading frequency thereof, comprising:

a. means for determining the presence of an item at a predetermined inspection position along the track;

b. means for directing a beam of light toward the inspection position;

c. means for scanning said beam transverse the direction in which threads are running on a surface of an item at the inspection position;

d. a photodetector positioned to detect the light reflected from said surface of the item at the inspection position;

e. counting means coupled to the output of said photodetector for counting pulses which exceed a predetermined threshold level during the presence of an item at the inspection position; and f. means for generating an occurrence indication as a function of the final count for each item.

* * * * *